United States Patent

Samsel

[11] 4,060,487
[45] Nov. 29, 1977

[54] APPARATUS FOR CLEANING OIL SPILLS

[76] Inventor: Frank J. Samsel, 13455 Lake Ave., Lakewood, Ohio 44107

[21] Appl. No.: 425,324

[22] Filed: Dec. 17, 1973

[51] Int. Cl.² ........................................... E02B 15/04
[52] U.S. Cl. ........................ 210/242 R; 210/DIG. 25
[58] Field of Search ................. 210/83, 242, DIG. 21; 214/500, 501

[56] References Cited

U.S. PATENT DOCUMENTS

| | | | |
|---|---|---|---|
| 2,056,495 | 10/1936 | Venema | 214/501 |
| 2,271,444 | 1/1942 | Schutz et al. | 214/501 |
| 3,142,281 | 7/1964 | Muller | 210/242 X |
| 3,326,379 | 6/1967 | Caddick | 210/242 |
| 3,353,696 | 11/1967 | Goodman | 214/501 |
| 3,384,253 | 5/1968 | Wood | 214/501 |
| 3,489,304 | 1/1970 | Barnes | 214/500 |
| 3,539,048 | 11/1970 | Pearson | 210/242 |
| 3,666,098 | 5/1972 | Garland et al. | 210/242 |
| 3,700,108 | 10/1972 | Richards | 210/242 |
| 3,727,766 | 4/1973 | Horne et al. | 210/242 |
| 3,730,119 | 5/1973 | Budris et al. | 210/242 |
| 3,760,944 | 9/1973 | Bell et al. | 210/242 |

Primary Examiner—Theodore A. Granger
Attorney, Agent, or Firm—William N. Hogg

[57] ABSTRACT

An apparatus for cleaning oil spills which utilizes various components as needed. In one embodiment a floating hull structure is provided having a crane for removing floating debris and a vacuum skimming unit and a pair of storage tanks for skimming and holding oil. Also, containers are provided on a separate boat and can be unloaded at dockside and replaced with fresh containers. Also, a truck unit may be provided which in one embodiment can carry either empty containers or a self-contained vacuum-tank unit.

4 Claims, 12 Drawing Figures

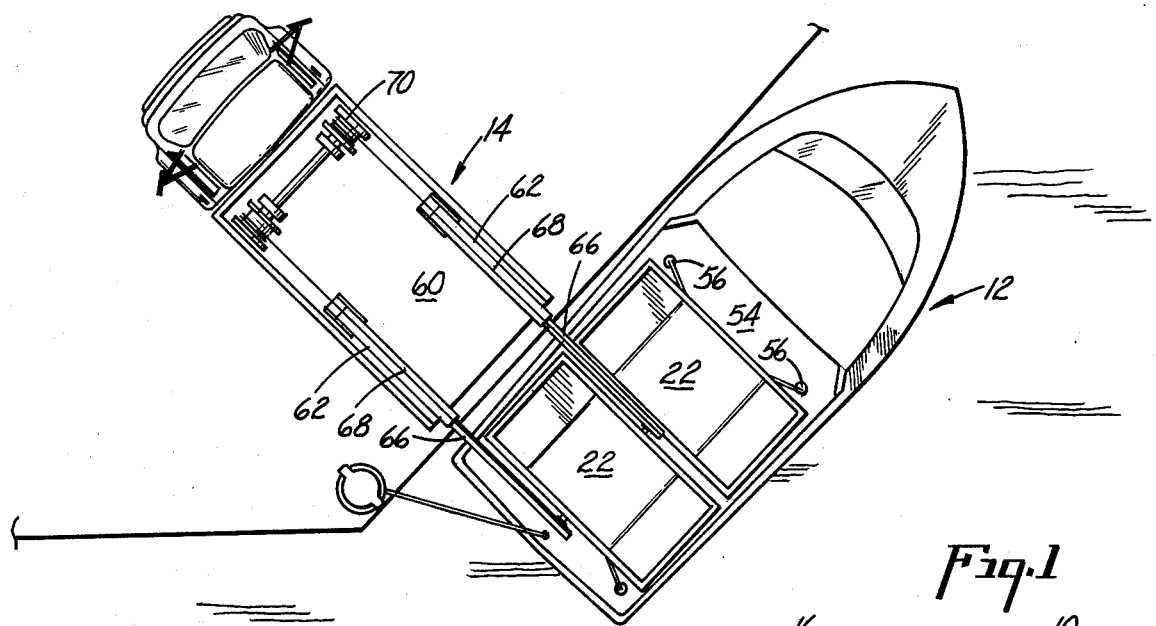
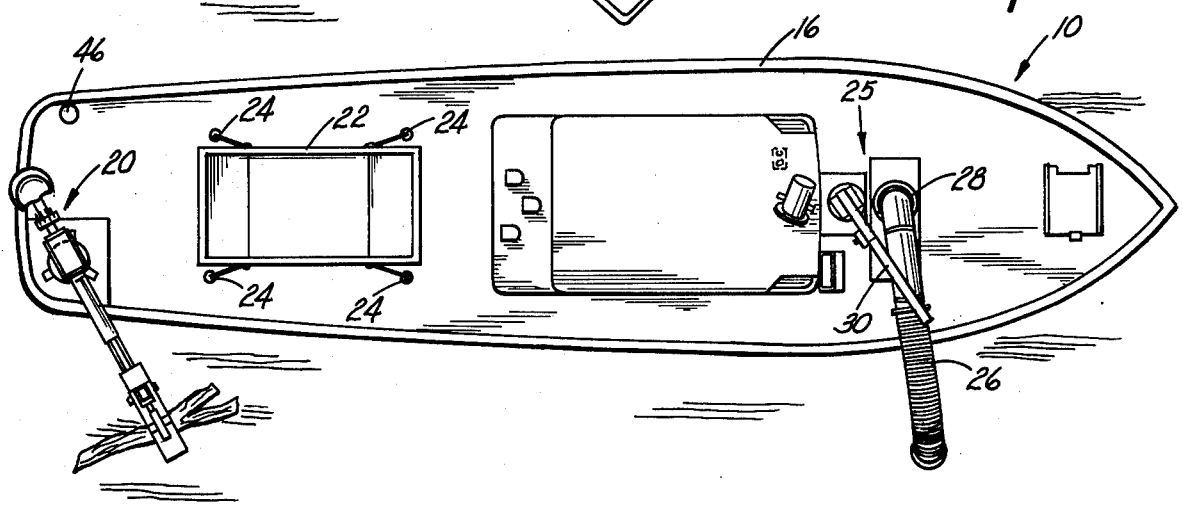
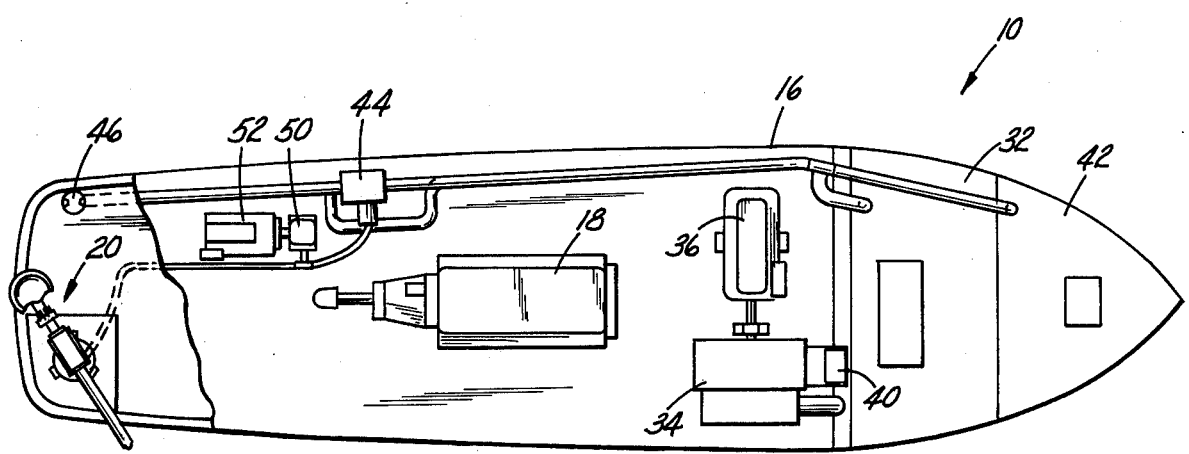

APPARATUS FOR CLEANING OIL SPILLS

BACKGROUND OF THE INVENTION

The cleaning of oil spills and other foreign material on the surface of water has become of major concern. More and more the necessity of quickly and effectively cleaning such oil and other foreign material is being recognized. As a result of this recognition, many different, individual techniques have been developed for cleaning the surface of the water of this unwanted foreign material. (Hereinafter, the term oil spills will refer generally to viscous floating material on the surface of the water, be it oil or other viscous material, it being intended that this term oil spills be broadly encompassing of any non-missable floating liquid or liquid-like material on the surface of a body of water).

The many different techniques which have been evolved include the vacuuming of the surface of the water, utilizing means to soak up the oil off the surface of the water and then removing the soaked oil from the soaking device, utilizing chemicals to aid in the conditioning of the spilled oil, as well as many other devices and techniques.

While all of these different techniques have found application in certain instances, and work effectively in certain limited situations, nevertheless these systems all have suffered from many serious limitations or drawbacks. Principal among these limitations has been that the various techniques and systems have had very limited ranges of operability both as to the type of oil which can be picked up and the condition of the spill such as the presence of solid floating objects, and/or the meteorological and hydrographical conditions under which they can operate and also the size of the job which they can continuously work on. Thus, while each of the previous systems has proven somewhat successful in various phases or areas of operations, there has been no system or technique devised which is operable on a broad scale of different types of spills under widely different meterological and hydrographical conditions and continuously operable over extensive periods of time to complete the operation on major spills.

SUMMARY OF THE PRESENT INVENTION

According to the present invention, a system comprised of various interacting and interrelated and certain unique components is provided, which will efficiently clean a wide variety of oils and other foreign matter from the surface of water under widely varying extreme weather and hydrographic conditions, and which can function relatively continuously until the completion of a large scale cleanup operation, and which components also are adaptable to be easily transported to the desired locale.

DESCRIPTION OF THE DRAWING

FIG. 1 is a plan view somewhat diagramatic showing a preferred embodiment of the system comprising a work boat, a tender boat, and a service truck;

FIG. 2 is a plan view of the work boat showing essentially the interior mechanisms thereof;

DESCRIPTION OF THE PREFERRED EMBODIMENTS

Figure 3:
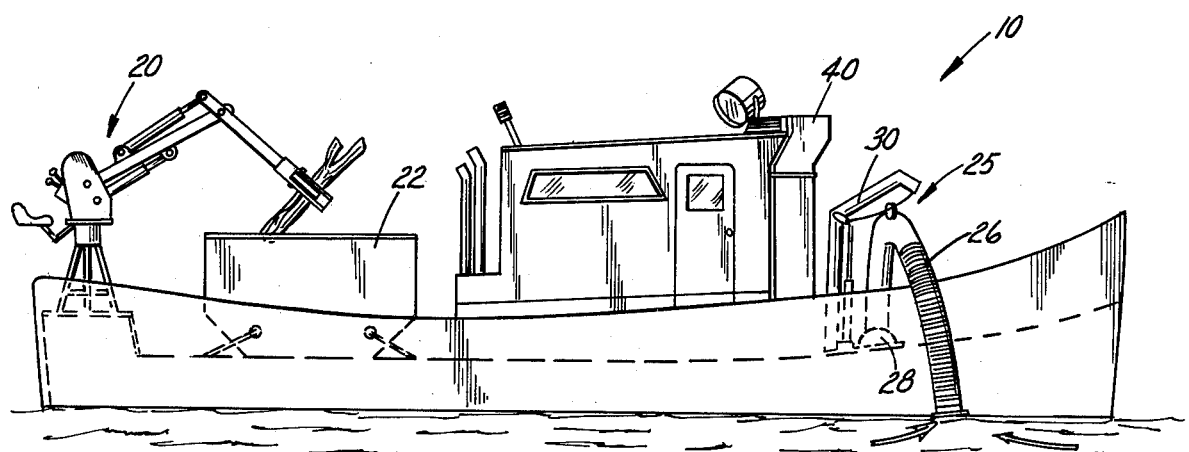
FIG. 3 is a side elevational view of the work boat.

Referring now to the drawing, and for the present to FIG. 1, one embodiment of a system for cleaning oil spills with its various components is shown. Basically, the system includes a work boat 10, a tender boat 12, and a service truck 14. The task of the work boat 10 is to clean the oil spills while the task of the tender boat 12 is to remove filled containers and supply empty containers, so that the work boat may operate in a continuous basis, and the task of the service truck 14 is to remove filled containers from the tender boat and supply it with empty containers.

Referring now to FIGS. 1 through 3, the work boat 10 which is the principal or primary component of the system includes a hull structure 16 which is sufficient in size and strength and adequate design to withstand the various weather and hydrographic conditions which it might encounter and to accommodate the various operating mechanisms which are required to perform the actual physical operation of removing an oil spill. The work boat 10 is powered by a main engine 18 with conventional controls therefore (unnumbered), which can be contained within a cabin or pilot house which can also serve as shelter for the crew.

Mounted near the stern of the boat 10 is a crane 20 having controls, therefore which crane is operable to pick up floating solid debris such as logs etc. from the surface of the water. An open top bin or hopper 22 is provided which rests on the deck aft of the cabin and forward of the crane and is positioned to receive debris picked from the water by the crane. Preferably a plurality of hold down eyes 24 are supplied on the deck to secure the bin against movement.

A vacuum suction system designated generally by the reference character 25 is also provided. This vacuum suction system includes a flexible hose 26 mounted forward of the cabin on a through deck swivel mounting 28 and the flexible hose 26 is movable in an arcuate path and up and down by means of a manually operated control rod 30.

Figure 4:
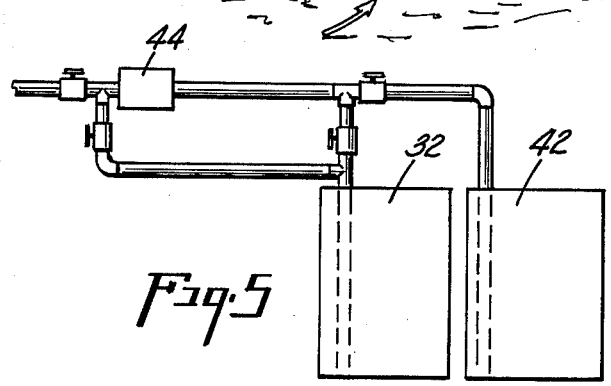
FIG. 4 is a perspective view partially in section somewhat diagramatic showing the receiving tank for the suction device.
Figure 5:
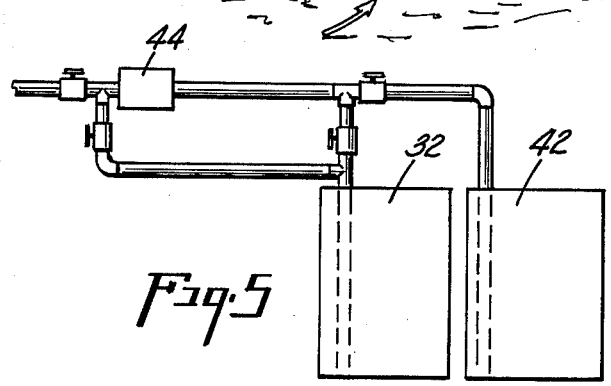
FIG. 5 is a somewhat schematic view of the piping arrangement between the two tanks for receiving the infused surface liquid.

The flexible hose 26 communicates through the swivel mounting 28 with a liquid receiving tank 32 mounted below the deck in the hull structure. A blower 34 is provided which is operable by a prime mover 36. The blower is connected to the tank 32 as shown in FIG. 4 to thereby create a vacuum using the top of the tank as a plenum. This will create a vacuum in the top of the tank 32 causing a suction action through the flexible hose 26 to act as a large suction device for skimming the surface of the water. A screen 38 is provided in the top of the tank 32 to protect against aspirated debris. Also, an exhaust 40 for the blower is provided.

A second liquid receiving tank 42 is also provided below decks forward of the liquid receiving tank 32. A pump 44 and suitable piping (unnumbered) is provided for the interconnection between the tanks 32 and 42, so that liquid can be pumped from either tank to the other tank or pumped from either tank to an outlet fitting 46 for discharge.

An hydraulic operated pump 50 is also provided which pump 50 is driven by an auxiliary engine 52. The pump 50 supplies the necessary power for operating the discharge pump 44, and also supplies the hydraulic fluid for operating the crane 20.

In operation the work boat 10 will proceed to the location of the oil spill. Preferably the boat will center itself in the area of the spill and commence operating at that point. Normally, it is required to first clear any floating debris such as logs, etc. from the spill which is done by means of the crane 20 lifting the debris out of the water and dropping it in the bin 22. This is done to prevent clogging or fouling of the vacuum system 25. Once the immediate area surrounding the boat has been cleared of debris the vacuum system 25 can then be operated to skim the surface of the water, thus removing the oil spilled on the surface. In order that the system be effective for a wide range of spills under widely varying hydrographic conditions, it is necessary to have a large diameter flexible hose with a large capacity vacuum, so that heavy black oil can be removed as well as lighter less viscous oil from the surface. As can be seen in FIG. 3, the hose 26 is supported above the water by means of the control rod or support device 30. The vacuum system is continued to operate sucking the liquid from the surface of the water and delivering it to the liquid receiving tank 32. The sucking or skimming operation will tend to pull the surrounding surface liquid into the area thus tending to not only clean the immediate area, but as the immediate area surrounding the boat is cleaned the surface liquid surrounding this moves in and is sucked up. Normally floating debris will tend to move in with this surface oil, and hence the crane is continued to be operated to remove the surface debris. Also, it is usually desirable to provide some type of physical restraint around the oil, which can be done with conventional boom, preferably laid out by the tender boat. Also, if desired an absorbent material can be spread on the oil.

As the tank 32 is filling the liquid may be pumped from the tank 32 to the tank 42. In certain instances, it may be desirable to add a emulsion breaker to the oil in the tank 42 to allow a separation of the oil and water. If this is done, it may be possible then to periodically discharge the water, thereby increasing the capacity of the tanks. In any event, the cleanup operation continues with the crane filling the bin 22, and the vacuum system filling the tanks 32 and 42.

When the capacity of the bin 22 or the tanks 32 and 42 have been reached, it is necessary to somehow get rid of the debris and oil therein. This is accomplished by means of the tender boat 12 and the service truck 14. The tender boat 12 has an open after deck structure 54 adapted to receive bins thereon. Hold down eyes 56 are provided to secure the bins in place. These bins can be either open top bins similar to the bins 22 shown on the work boat 10 or they can be closed top bins of the type shown generally in FIG. 7a adapted to receive liquid pumped therein from the outlet fitting 46. In any event, the tender boat 12 will meet the work boat 10 and the debris collected in the bin 22 can be transferred to one of the bins on the tender boat 12 and/or oil can be pumped from the outlet fitting 46 into a bin on the tender boat. When these are filled, the tender boat can then return to shore where the filled bins are removed and empty bins replaced by the service truck 14.

Figure 6:
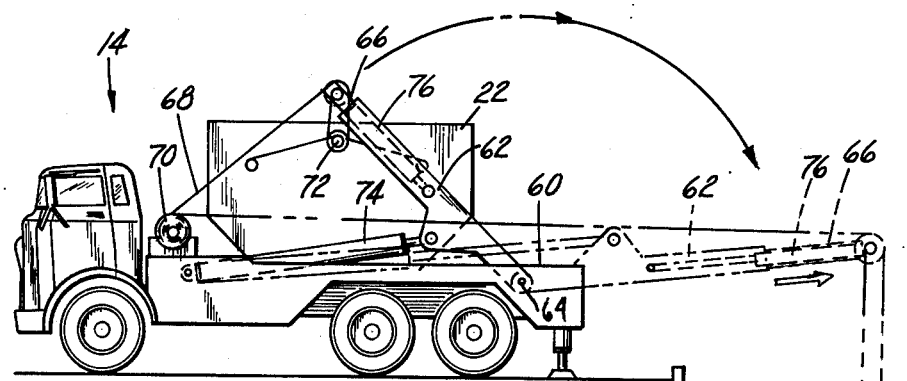
FIG. 6 is a side elevational view somewhat diagramatic of a service truck and tender boat according to this invention showing in phantom outline the loading or unloading of a container from or to the boat at dock to or from the truck.
Figure 7:
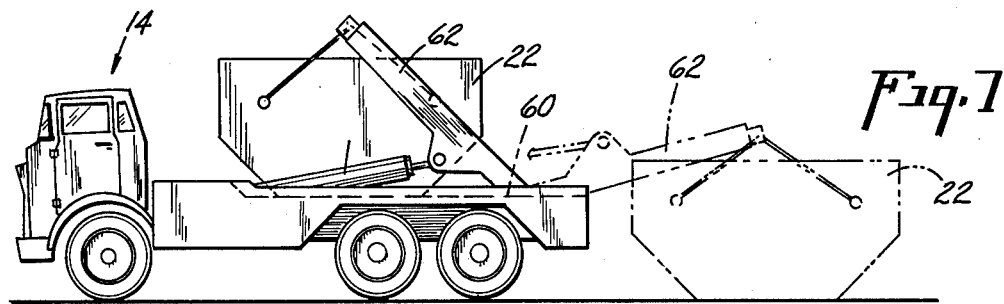
FIG. 7 is a side elevational view showing in phantom outline the loading or unloading of a container from the truck on the ground.
Figures 7A, 7B:
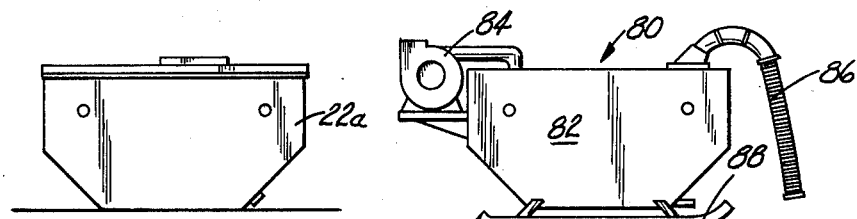
FIG. 7a is an elevational view of a closed type container for receiving liquid.
FIG. 7b is a side elevational view somewhat diagramatic of a self-contained vacuum and tank unit for sucking liquid.

Referring now to FIG. 1, 6, and 7, the service truck 14 has a flat rear bed 60 adapted to support any of the bins carried by the tender boat 12. A pair of lifting arms 62 are pivotly mounted as shown at 64 on opposite sides of the bed 60 each of which lifting arms has a telescoping member 66. A pair of cables 68 is provided, one for each arm which cables are wrapped around a winch drum 70 and operate over pulley systems 72. A hydraulic cylinder 74 operates the arms 62 in a pivotal fashion and hydraulic cylinders 76 operate the telescoping booms 66 of the arms so that these arms may pivot and extend and with the pulley system may unload a container from a boat as shown in FIG. 6. This allows the service truck 14 to load and unload containers both from a boat well below ground level on a dock as well as on level ground. Thus, the surface truck can unload filled containers and load empty containers on to the boat taking the filled containers away for removal of the refuse and/or oil and returning the empty container.

Thus, with the system of a work boat, tender boat and service device on the dock, a work boat can continuously operate to clean up oil spills utilizing mechanical means to pick up floating debris and contain it, and a large vacuum device for actually sucking the oil or other surface contaminants off the water with the tender boat periodically removing the debris and/or collected skimmed oil, and the dock side service facilities providing bins and containers and removing filled bins and containers from the tender boat. Hence a complete system is provided which allows the work boat to go to and stay on the scene and work continuously, with the basic facilities on board to both clear the debris and the floating oil, also facilities on board being adaptable for cleaning a wide variety of oils and a wide variety of hydrographic and meteorological conditions, and the boats being of sufficient strength and size to weather severe meteorological and hydrographic conditions.

Figure 7C:
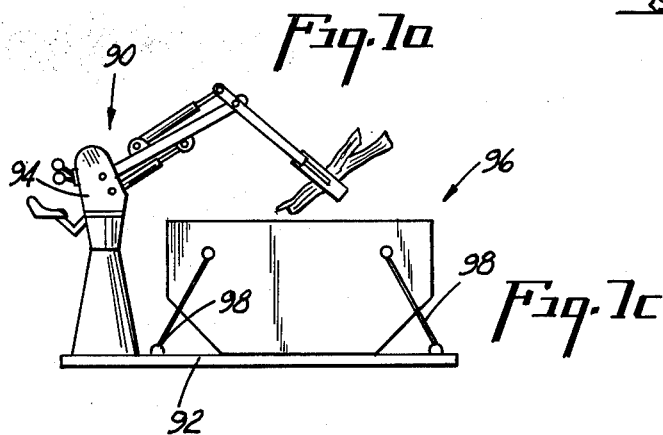
FIG. 7c is a side elevational view of a self-contained crane and container unit.

The system of a large work boat with associated tender boat and service truck as shown in FIG. 1 is quite adaptable to use where the boat can be left in the water and can propel itself to oil spills quickly from its normal berth. Thus, in large metropolitan areas where there may be a frequent need for cleaning of oil spills, this system works quite well. However, there are occasions where the oil spill is at an area remote to that that is easily accessible by a boat yet which is subjected to an oil spill. The system shown diagramatically in FIG. 7 is one such system which is adopted to clean oil spills in a remote area which may not be accessible by large boats. In this system, the service truck 14 provides the central transport device for the system. In this system, special vacuum-tank unit 80 is provided which includes a receiving tank 82 and a vacuum producing blower unit 84 mounted thereon. The blower unit 84 creates a vacuum in the top of the tank 82 as in the previously described embodiment and a swivelly connected flexible 86 is provided which will skim the surface of the water. The tank 82 is mounted on skids 88 and the truck 14 delivers the unit to the area requiring service. If it can stay on land, it will set on the land near the oil spill, or it may be deposited into any boat of sufficient size and capacity to carry it to the oil spill. The unit will itself operate to clean up the spill and separate tanks such as the tank 22a can be supplied to periodically pump out the vacuum tank unit 80 by means of output fittings and fluid pumps not shown, and this can be carried on a separate boat. This bin 22a can also be delivered to the scene by the service truck 14. This provides the needed flexibility to deliver a vacuum operated unit to remote areas which a large vessel such as the work boat 10 could not reach. This also provides for rapid transportation on the ground to an area in the time of need, so that it can be quickly supplied over land to remotely accessible areas providing a unit which can clean up the spills even in areas not normally accessible to larger units. Also, the unit of FIG. 7b can be loaded on a general purpose work boat, such as the tender boat 12, and taken to and utilized at an oil spill. Similarly, the crane and bin unit generally designated as 90 in FIG. 7c can be transported to a spill either by a truck, or on a tender boat, either alone or in conjuction with a unit of the type shown in FIG. 7b. This crane and bin unit 90 has a flat support plate 92 which has mounted thereon in one corner a crane unit 94 which is self-contained with respect to operating controls. A bin 96 which can be of the type previously designed is supported on the plate 92 and held down by ties and eyes 98. Hence this unit can be transported as needed to oil spills.

Figure 8:
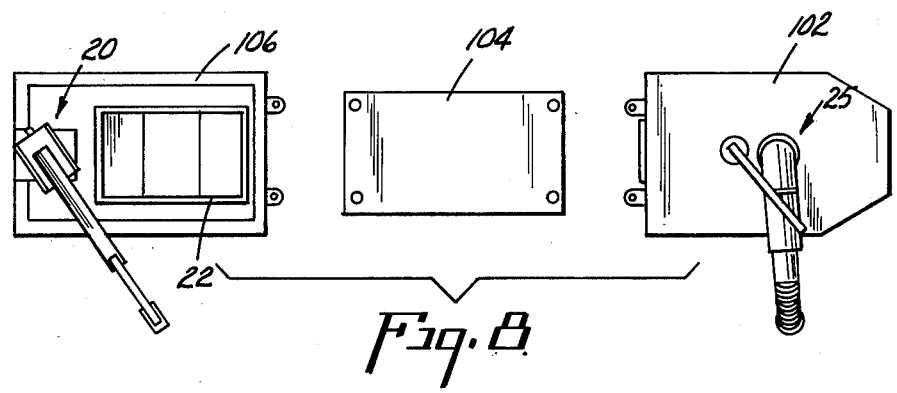
FIG. 8 is a plan view somewhat diagramatic of a three-unit compartmentalized vessel, each of which units is independent and capable of being moved separately.
Figure 9:
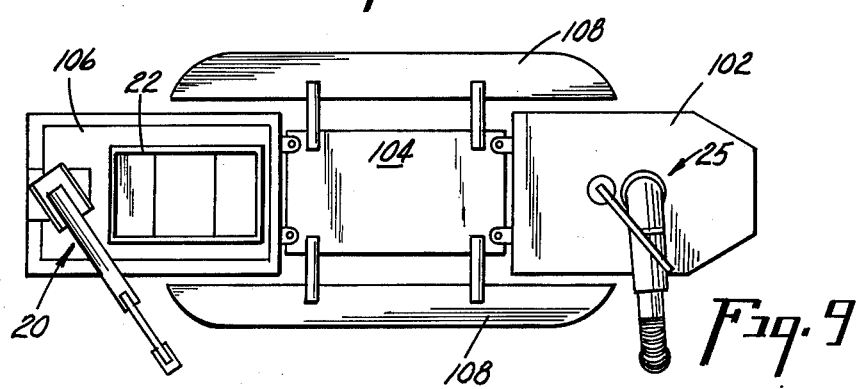
FIG. 9 is a plan view of the three units of the vessel of FIG. 8 interconnected to form a unitary floating structure.

In another embodiment, which is shown in FIGS. 8 and 9, a very large capacity work boat is provided which is actually formed in a plurality of sections which will allow for quick transportation, even by air, if necessary, to the location of a spill which sections can be joined and when joined provide a large capacity heavy duty work boat component of the system. As shown in FIGS. 8 and 9, the boat is made up of a forward section 102, a mid-section 104, and a stern section 106. Each of these sections is built independently and is independently buoyant, but they can be joined as shown in FIG. 9 such as by sponsons 108 to provide a unitary floating structure. Each of the sections will contain a portion of the components, the exact portion of the components contained by each depending on various factors including weight, distribution, volume, etc. However, in the disclosed embodiment the forward section 102 contains the vacuum system 25 which is similar to that shown in the work boat 10, the stern section 106 contains the crane 20 and area for the supporting of the bin 22 and also preferably contains the auxiliary motor and hydraulic pump for power, and the mid-section 104 contains the main power unit 18 and controls and on the deck preferably contains the cabin or wheel house. These sections are all united by the sponsons 108 and the boat can then be moved under its own power to the location of the oil spill and perform in a manner similar to that of the work boat 10 as previously described. However, in this embodiment since the boat is manufactured in sections, these sections can be transported quickly by land or even by air to the locations of the spill. This, of course, provides a very flexible system which will allow quick attention to spills which occur at locations where there is not located any facilities or sufficient facilities for cleaning up a given oil spill.

While the invention has been described with some degree of particularity, it is believed that essentially it comprised a system of interrelated interacting components which will allow an oil spill to be cleaned up quickly, effectively under a wide range of meteorological and hydrographic conditions, and which system can be easily transported to the location of the spill and operate substantially continuously in cleaning up the spill.

What is claimed is:

1. An integrated system for collecting and transferring to land for disposal thereon liquid and solid waste floating on or near the surface of a body of water, said system comprising, in combination:

a floating vessel with a hull and a deck, crane means with controls therefor mounted on the deck of said vessel and positioned for removing large solids from said body of water, container means removably installed on said deck adjacent said crane for containing said solids, storage tank means for the storage of liquid waste which has been removed from the surface of said body of water, pump means for producing a vacuum connected to said storage tank means, hose means with a first open end connected to said storage tank means and a second open end constructed and arranged to draw in surface liquid while spaced above the surface of said body of water, support means for supporting the second open end of said hose spaced above the surface of said body of water, pump means connected to said storage tank for removing the contents thereof, and shore based means including a truck for removing containers filled with solid waste from the deck of said vessel when at a dock, whereby said containers may be transported by said truck for the disposal of said solid waste on land.

2. The combination of claim 1 further characterized by a second hull structure and deck means therefore having means to removably receive a container for the reception of solids.

3. The invention as defined in claim 1 wherein said shore based truck includes a bed, a pair of arms disposed on opposite sides of said bed, means to pivot each of said arms in a plane longitudinal of said truck, each of said arms having telescoping members for extension and retraction, and means to extend and retract said members, cables and pulleys operatively associated with each of said arms, and drive means and controls to wrap and unwrap said cables whereby to load and unload containers on a level below that on which the truck rests.

4. The invention as defined in claim 1 further characterized by said tank means including at least two tanks whereby liquid may be pumped to either of said tanks.

* * * * *